United States Patent
Yu et al.

(10) Patent No.: US 7,554,797 B2
(45) Date of Patent: Jun. 30, 2009

(54) FIXING STRUCTURE

(75) Inventors: Chris Yu, Taipei (TW); Yung-Chi Yang, Taipei (TW)

(73) Assignee: Inventec Corporation, Taipei (TW)

( * ) Notice: Subject to any disclaimer, the term of this patent is extended or adjusted under 35 U.S.C. 154(b) by 482 days.

(21) Appl. No.: 11/395,956

(22) Filed: Mar. 30, 2006

(65) Prior Publication Data

US 2007/0044300 A1 Mar. 1, 2007

(30) Foreign Application Priority Data

Aug. 30, 2005 (TW) .............................. 94214915 U

(51) Int. Cl.
*H05K 5/00* (2006.01)
*H05K 7/00* (2006.01)

(52) U.S. Cl. .................................................. 361/679.01

(58) Field of Classification Search ................. 361/679, 361/681, 683

See application file for complete search history.

(56) References Cited

U.S. PATENT DOCUMENTS

| 6,262,887 | B1 * | 7/2001 | Lee ............................ 361/683 |
| 6,532,152 | B1 * | 3/2003 | White et al. ................. 361/692 |
| 7,075,785 | B2 * | 7/2006 | Minaguchi et al. .......... 361/683 |
| 7,394,186 | B2 * | 7/2008 | Kim ............................ 313/46 |
| 2004/0264113 | A1 * | 12/2004 | Darr et al. .................... 361/601 |

* cited by examiner

*Primary Examiner*—Jayprakash N Gandhi
*Assistant Examiner*—Anthony M Haughton
(74) *Attorney, Agent, or Firm*—Peter F. Corless; Steven M. Jensen; Edwards Angell Palmer & Dodge LLP

(57) ABSTRACT

A fixing structure for fixing a casing and a base frame of an electronic device together includes: a melt hole disposed in the base frame and a melt post formed on the casing, wherein the melt hole is provided with an opening having its diameter being gradually enlarged from inside outward, so that when combining the casing with the base frame, the melt post passes through the melt hole and is exposed by the opening. Through the design of the opening, the fixing effect upon melting can be strengthened without occupying a lot of space around the melt hole.

12 Claims, 5 Drawing Sheets

FIXING STRUCTURE

FIELD OF THE INVENTION

The present invention relates to a fixing structure, and more particularly to a fixing structure applied to an electronic device to fix a casing and a base frame thereof.

BACKGROUND OF THE INVENTION

With the wide application of electronic products such as notebook computers in people's work and life, portability has become a basic factor for people to evaluate an electronic product. As a result, electronic products such as ultra slim notebook computers have become the mainstream.

Currently, the cover member of many electronic products such as notebook computers is usually composed of a plastic casing and a metal base frame, wherein the metal base frame is fixed to the plastic casing to increase mechanical intensity of the plastic casing. In the prior art, the casing and the base frame are usually locked together by screws. However, to meet requirements of lighter, thinner, shorter and smaller electronic products, it is preferable to use a melting method to fix the casing with the base frame. The melting method includes: disposing a melt post on the plastic casing and a melt hole on the metal base frame; inserting the melt post into the melt hole to attach the casing to the base frame; and melting the melt post to fix the base frame to the casing.

As shown in FIGS. 1 and 2, a melt hole 21' having a uniform diameter up and down is disposed on a base frame 2'. To relatively fix the melt post with the melt hole 21', the melted portion of the melt post inserted into the melt hole 21' should be spread around the outlet of the melt hole 21'. However, to ensure the fixing intensity between the melt post and the melt hole 21', not only a lot of space around the melt hole 21' will be occupied, the melt post also needs to protrude a certain height from the outlet surface of the melt hole 21'. Accordingly, the melted portion of the melt post is piled on the base frame 2', thereby affecting the subsequent assembling process.

On the other hand, with a developing trend of ultra slim notebook computers, the alloy base frame is made as thin and as small as possible. As a result, the space around the melt hole becomes smaller. If the fixing intensity is increased by increasing the height of the melt post, the melted portion of the melt post will be piled on the base frame, thereby the subsequent assembly process is affected and the improved effect of the melt intensity is not so obvious.

Accordingly, there is a need to develop a fixing structure capable of providing a good fixing intensity between the casing and the base frame.

SUMMARY OF THE INVENTION

According to the above defects, a primary objective of the present invention is to provide a fixing structure having good fixing intensity.

Another objective of the present invention is to provide a fixing structure capable of preventing the plastic from piling up, which could affect the subsequent assembling process.

To achieve the above and other objectives, a fixing structure for fixing a casing and a base frame of an electronic device comprises: a melt hole disposed on the base frame and a melt post disposed on the casing, wherein the melt hole is provided with an opening having its diameter being gradually enlarged from the inside outward, such that when combining the casing with the base frame, the melt post passes through the melt hole and is exposed by the opening so as to allow the melt post to be melted inside the melt hole for fixing the casing with the base frame.

Compared with the prior art, the opening gradually enlarged from inside outward allows the melted portion of the melt post to be filled therein, as a result, the melt hole is stably and firmly fixed with the melt post, thereby fixing the casing to the base frame of the electronic device.

Further, the design of the opening allows the stress applied to the melt post to be dispersed, and accordingly, the melt post could endure a larger external force, thereby increasing the fixing intensity.

Moreover, because the melt post does not need to be protruded from the surface of the base frame, a lot of space around the melt hole could be saved, and the subsequent assembly process of the electronic device would not be affected by the piled up melted portion of the melt post in the prior art.

DETAILED DESCRIPTION OF PREFERRED EMBODIMENTS

Hereunder, embodiments of the present invention will be described in full detail with reference to the accompanying drawings.

Figure 3:
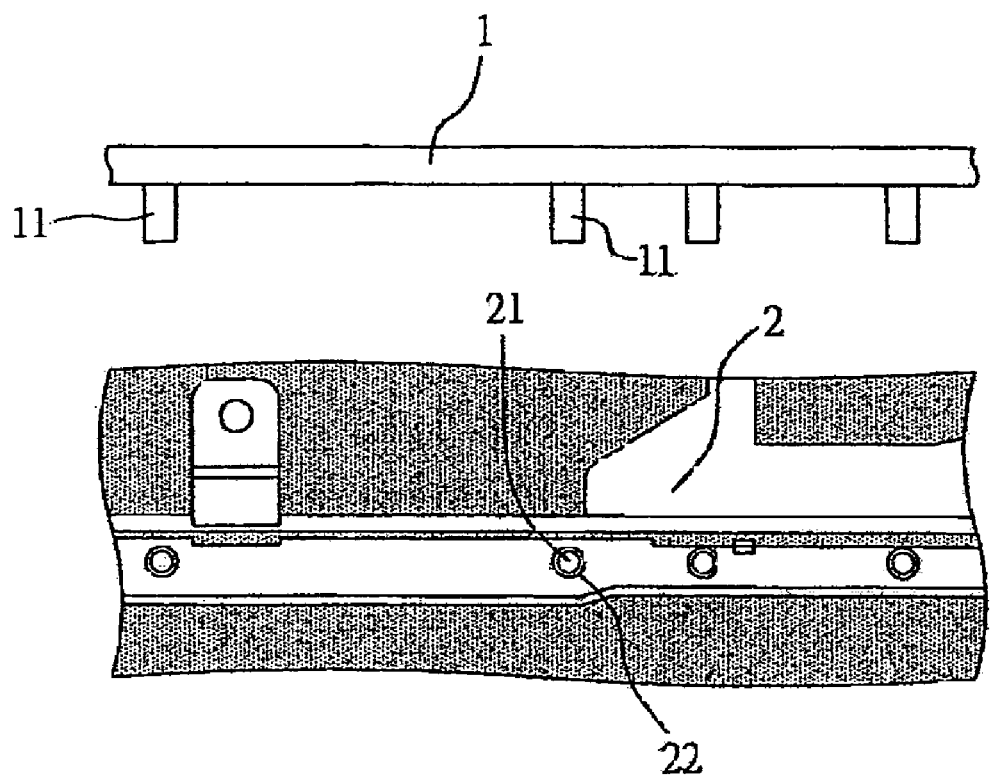
FIG. 3 is a disassembly diagram of a fixing structure according to the present invention.

The fixing structure of the present invention is used to fix a casing with a base frame of an electronic device. Referring to FIG. 3, a fixing structure of the present invention includes a melt post 11 disposed on a casing 1 and a melt hole 21 disposed on a base frame 2, wherein the casing 1 is made of plastic material and the base frame 2 is made of metal, the metal post 11 is integrally formed together with the casing 1 and the melt hole 21 is provided with an opening 22 gradually enlarged from inside outward.

Figure 4:
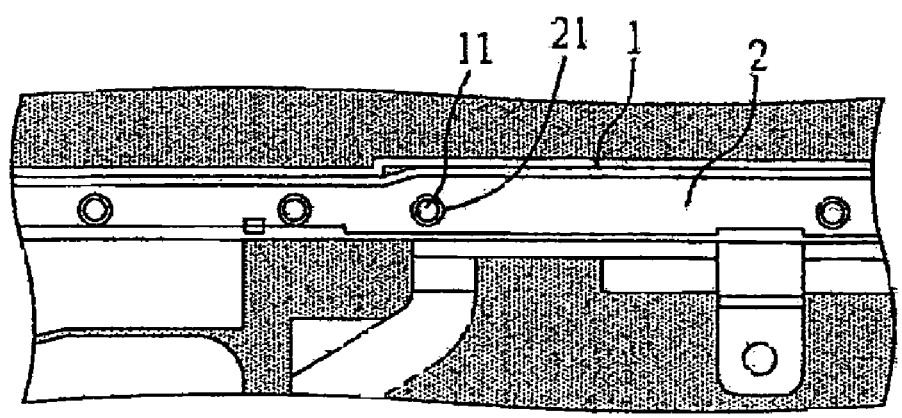
FIG. 4 is an assembly diagram of FIG. 3.

Referring to FIG. 4, when combining the casing 1 with the base frame 2, the melt post 11 is passed through the melt hole 21 and exposed by the opening 22, thereafter, the end of the melt post 11 is melted and filled in the opening 22 to fix the melt post 11 in the melt hole 21, thereby relatively fixing the casing 1 with the base frame 2.

Figure 1:
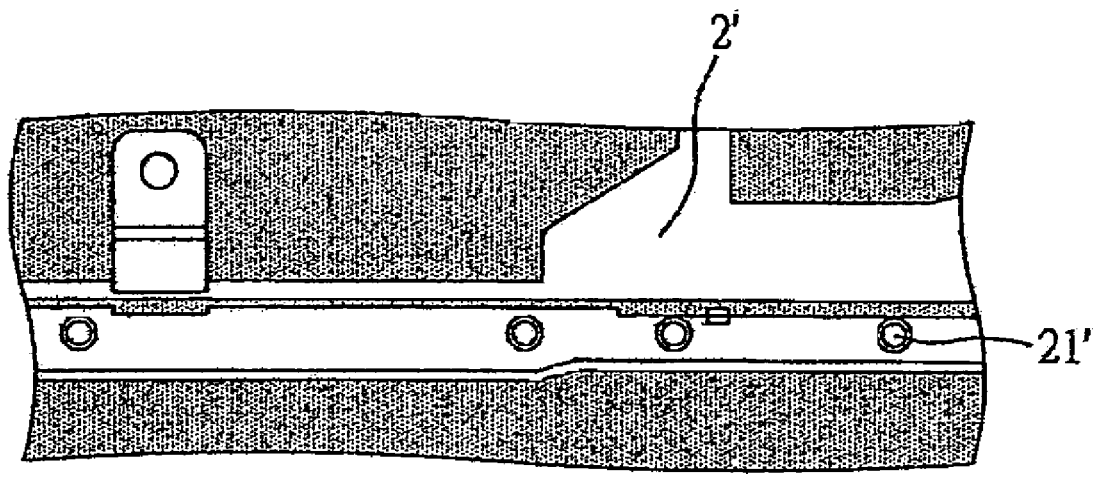
FIG. 1 is a diagram of a melt fixing structure of the prior art.
Figure 2:
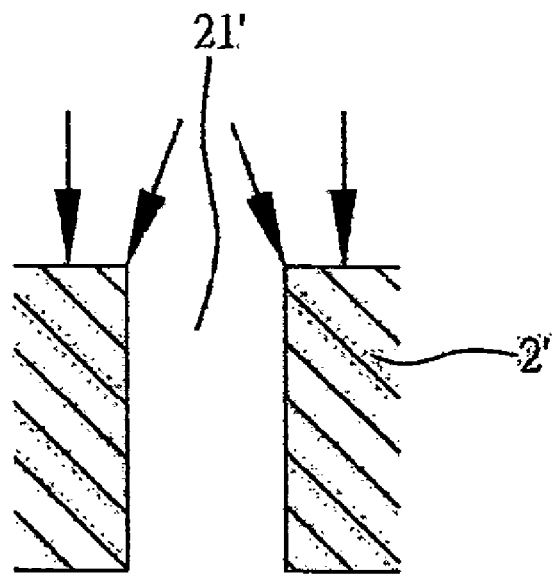
FIG. 2 is a longitudinally sectional view of a melt hole of the prior art.
Figure 5:
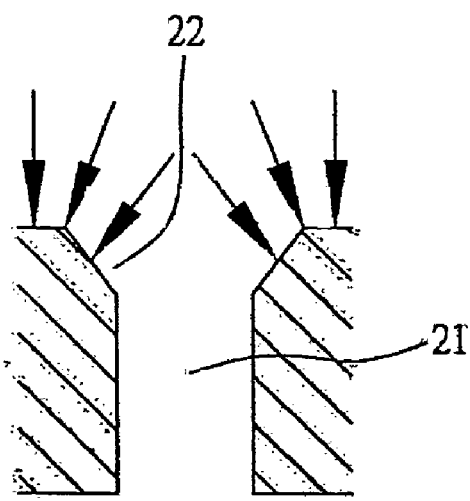
FIG. 5 is a longitudinally sectional view of a melt hole of the fixing structure according to an embodiment of the present invention.

FIG. 5 shows a longitudinally sectional view of a metal hole according to the present invention. Referring to FIGS. 2 and 5, the melt hole 21 is a cylindrical hole and the longitudinally sectional view of the opening 22 of the melt hole 21 is a reverse isosceles trapezoid, i.e., the caliber of the opening 22 is gradually enlarged from that of the melt hole 21. In the present embodiment, when the melt post 11 inserted into the melt hole 21 is melted and filled in the opening 22, since the caliber of the opening 22 is bigger than that of the melt hole 21, the diameter of the melted portion of the melt post 22 is also bigger than that of the rest portion of the melt post 11. Accordingly, the melted portion of the melt post 11 is securely retained in the opening 22, thereby relatively fixing the casing 1 with the base frame 2.

Meanwhile, the design of the opening 22 allows the stress applied to the melt post 11 to be dispersed, thereby increasing the fixing intensity between the melt post 11 and the melt hole 21.

Furthermore, because the melted portion of the melt post 11 is filled in the opening 22 instead of piled on the base frame 2, the subsequent assembly process will not be affected by the piled melted portion. In addition, the opening 22 could easily be formed by performing a post-processing after the formation of the melt hole 21 or integrally formed together with the melt hole 21 by repairing a die.

Figure 6:
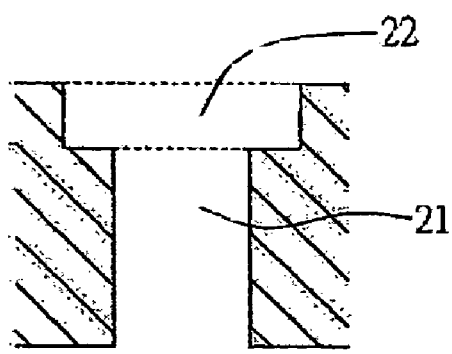
FIG. 6 is a longitudinally sectional view of an opening of a melt hole in the form of a rectangle.
Figure 7:
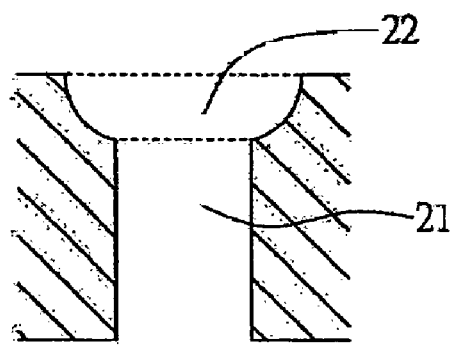
FIG. 7 is a longitudinally sectional view of an opening of a melt hole in the form of an irregular quadrangle.
Figure 8:
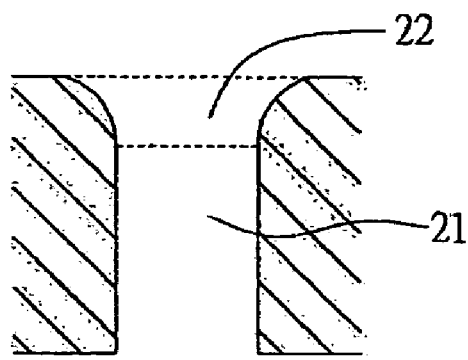
FIG. 8 is a longitudinally sectional view of an opening of a melt hole in the form of another kind of irregular quadrangle.

The melt hole 21 and opening 22 of the fixing structure of the present invention could also be disposed as a square column or the like. FIGS. 6 through 8 show the longitudinally sectional view of the opening 22 having different structures with a single level of difference. However, the minimum radius of the opening 22 must be ensured to be no less than the maximum radius of the melt hole 21.

As shown in FIG. 6, the longitudinally sectional view of the opening 22 is in the form of a rectangle; as shown in FIGS. 7 and 8, the longitudinally sectional view of the opening 22 is in the form of a quadrangle, two sides of which corresponding to the walls of the opening 22 are in arc shape such that the opening 22 is basin-shaped.

Again referring to FIGS. 9 through 11, the opening 22 is provided with a plurality of levels of difference. The longitudinally sectional view of the opening 22 is in the form of two connected quadrangles, which could be a combination of any of two of the group consisting of a rectangle, a trapezoid and any other kind of irregular quadrangle.

Figure 9:
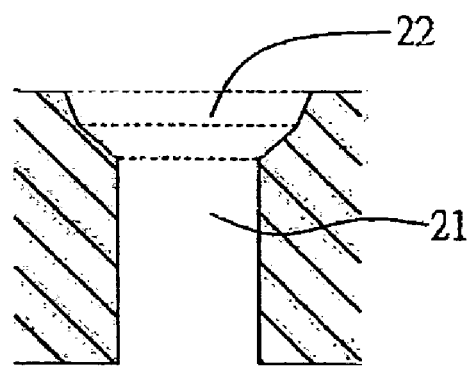
FIG. 9 is a longitudinally sectional view of an opening combining a quadrangle with a trapezoid.
Figure 10:
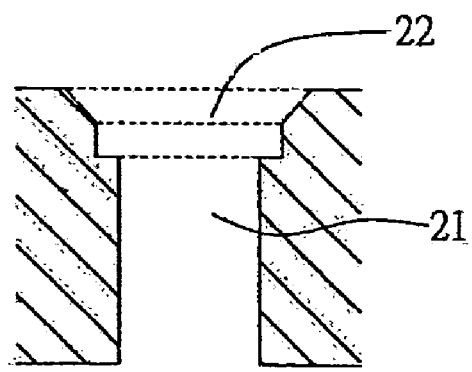
FIG. 10 is a longitudinally sectional view of the opening having another combination of a quadrangle and a trapezoid.
Figure 11:
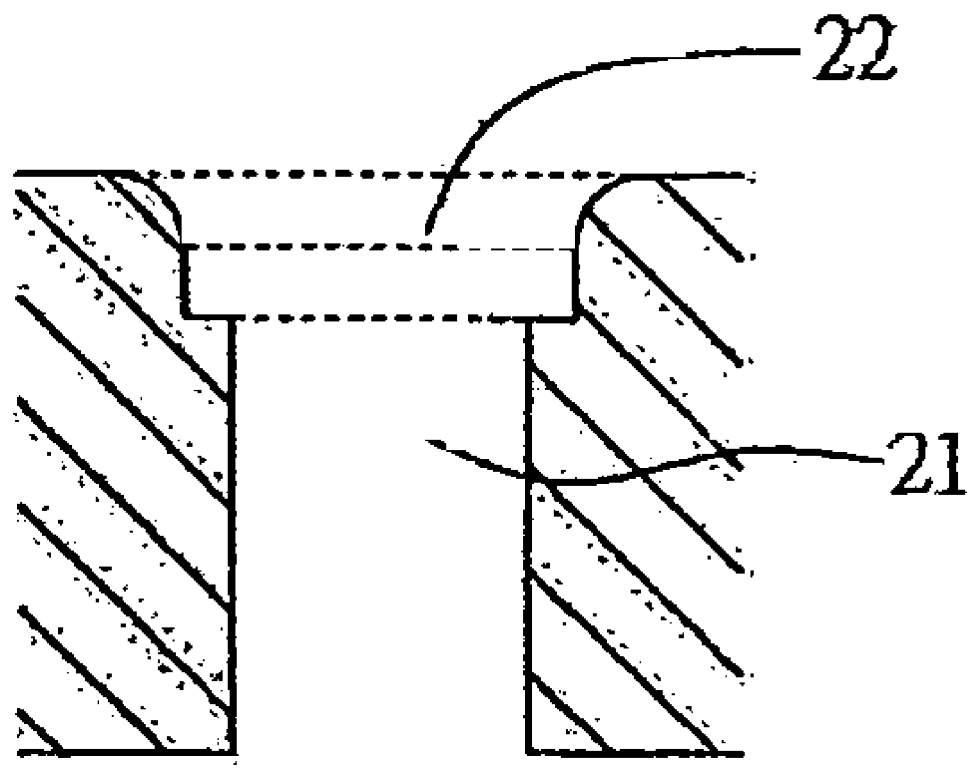
FIG. 11 is a longitudinally sectional view of an opening combining a rectangle and an irregular quadrangle.

As shown in FIG. 9, the longitudinally sectional view of the opening 22 is a combination of a rectangle and a trapezoid. As shown in FIG. 10, the longitudinally sectional view of the opening 22 is still a combination of a rectangle and a trapezoid, the difference of which from FIG. 9 is that the rectangle and the trapezoid are in the reversed positions. As shown in FIG. 11, the longitudinally sectional view of the opening 22 is a combination of a rectangle and a quadrangle, two sides of the quadrangle corresponding to the walls of the opening 22 being in arc shape.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A fixing structure for fixing a casing and a base frame of an electronic device together, comprising:
a melt hole formed on the base frame and provided with an opening having its diameter being gradually enlarged from inside outward; and
a melt post disposed on the casing, wherein when combining the casing with the base frame, the melt post passes through the melt hole and is exposed by the opening of the melt hole, and a portion of the melt post is melted to fill the opening.

2. The fixing structure of claim 1, wherein the opening is provided with a single level of difference in diameter.

3. The fixing structure of claim 1, wherein the opening is provided with a plurality of levels of difference in diameter.

4. The fixing structure of claim 2, wherein a longitudinally cross-sectional shape of the opening is at least one of a rectangle and a trapezoid.

5. The fixing structure of claim 3, wherein a longitudinally cross-sectional shape of the opening is at least one of a rectangle and a trapezoid.

6. The fixing structure of claim 2, wherein a longitudinally cross-sectional shape of the opening is a quadrangle with two sides thereof in an arc shape.

7. The fixing structure of claim 3, wherein a longitudinally cross-sectional shape of the opening is a quadrangle with two sides thereof in an arc shape.

8. The fixing structure of claim 1, wherein the melt hole has a shape of one selected from the group consisting of a cylinder shape and a square column shape.

9. The fixing structure of claim 1, wherein the melt post has a shape of one selected from the group consisting of a cylinder shape and a square column shape.

10. The fixing structure of claim 1, wherein the casing is made of plastic material.

11. The fixing structure of claim 1, wherein the melt post is integrally formed with the casing.

12. The fixing structure of claim 1, wherein the base frame is made of metal.

* * * * *